United States Patent

Tsuyoshi et al.

Patent Number: 5,719,719
Date of Patent: Feb. 17, 1998

[54] MAGNETIC DISK DRIVE WITH SENSING CURRENT ADJUSTMENT OF MR HEAD

[75] Inventors: Toshiaki Tsuyoshi, Odawara; Futoshi Tomiyama, Hachiouji, both of Japan

[73] Assignee: Hitachi, Ltd., Tokyo, Japan

[21] Appl. No.: 207,024

[22] Filed: Mar. 7, 1994

[30] Foreign Application Priority Data

Mar. 9, 1993 [JP] Japan .................... 5-047727

[51] Int. Cl.$^6$ .................... G11B 5/03
[52] U.S. Cl. .................... 360/66; 360/65; 360/75; 360/46
[58] Field of Search .................... 360/65, 77.04, 360/77.06, 31, 69, 75, 137, 46, 66, 113

[56] References Cited

U.S. PATENT DOCUMENTS

| | | | |
|---|---|---|---|
| 4,012,781 | 3/1977 | Lin | 360/75 |
| 4,701,815 | 10/1987 | Yada et al. | 360/77.06 |
| 4,703,371 | 10/1987 | Redmond et al. | 360/75 |
| 4,807,074 | 2/1989 | Kamo | 360/113 |
| 4,821,125 | 4/1989 | Chrisbensen et al. | 360/31 |
| 4,908,722 | 3/1990 | Sonobe | 360/46 |
| 4,949,202 | 8/1990 | Kim | 360/78.14 |
| 5,164,866 | 11/1992 | Sano et al. | 360/51 |
| 5,331,492 | 7/1994 | Komai et al. | 360/77.06 |
| 5,339,207 | 8/1994 | Moon et al. | 360/77.05 |
| 5,367,411 | 11/1994 | Nishiyama et aal. | 360/66 |

*Primary Examiner*—Aristotelis M. Psitos
*Assistant Examiner*—Larry T. Cullen
*Attorney, Agent, or Firm*—Antonelli, Terry, Stout, & Kraus, LLP

[57] ABSTRACT

A sensing current adjusting zone is formed in the outermost or innermost periphery of a magnetic disk and reference signals are recorded in a recording width corresponding to the width of a plurality of tracks in the sensing current adjusting zone so that the phases of the reference signals are the same and the radially adjacent reference signals overlap each other. When adjusting the sensing current, an MR head is moved forcibly into the sensing current adjusting zone to reproduce the reference signal and the sensing current is adjusted so that the difference between the respective absolute values of the plus peak and the minus peak of the reproduced reference signal is reduced to the least extent. Therefore, in a magnetic disk unit of a servo system or the like provided with an MR head for reproducing servo information, the sensing current to be supplied to the MR head can be adjusted to an optimum current, the sensing current can be correctly adjusted even in a process in which the servo system of the magnetic disk unit is unable to carry out positioning control. A feedback loop for sensing current adjustment is capable of always adjusting the sensing current to an optimum current even if the characteristics of the MR head varies with time.

16 Claims, 8 Drawing Sheets

(a) NOT YET ADJUSTED     (b) ADJUSTED

MAGNETIC DISK DRIVE WITH SENSING CURRENT ADJUSTMENT OF MR HEAD

BACKGROUND OF THE INVENTION

1. Field of the Invention

The present invention relates to a magnetic disk drive and, more specifically, to a magnetic disk drive provided with a magnetoresistive head (MR head) using a magnetoresistive device (MR device) as a signal reproducing device.

2. Description of the Related Art

Recent progressively increasing recording density of magnetic disk drives has urged the magnetic disk industry to utilize innovative techniques. An example of utilization of innovative techniques is the employment of a MR head utilizing magnetoresistance effect instead of an inductive head utilizing electromagnetic induction as a signal reproducing head. Magnetoresistance effect is the slight change in electrical resistance in a magnetically anisotropic substance, such as Permalloy, on application of an external magnetic field thereto.

The MR head utilizes the magnetoresistance effect of a MR device. The MR head supplies a fixed current to its MR device and detects the variation of the voltage across the MR device caused by the variation of the leakage flux (recording signals) from a magnetic recording medium. The MR head is featured by the intensity of its output signals being independent of the relative velocity of the MR head with respect to the magnetic recording medium and the intensity of its output per unit track width being ten times that of the inductive head or above, which is dependent on operating conditions. The MR head having such features are expected to be a desirable magnetic head capable of coping with high-density recording using tracks having a very narrow track width.

Recently, an embedded servo system has been used for making the head follow information tracks formed on the surface of a magnetic recording medium. Generally, the conventional magnetic disk drive employs a dedicated servo system. The dedicated servo system uses one of the surfaces of one of a plurality of disks mounted on a spindle as a servo surface, a servo head is connected with the servo surface for position control, and data heads are moved according to the movement of the servo head.

Although the dedicated servo system has a simple configuration and a high degree of freedom of adaptability to data format, the data head cannot follow the data track in a sufficiently high positioning accuracy due to thermal displacement and the like of the mechanical system when the data tracks are formed in a high density, because the data head does not detect the position for itself. On the other hand, the embedded servo system records positioning information at intervals on each of the tracks formed in the data surface to enable each data head to position itself for recording and reproducing data. Although the embedded servo system is subject to some restrictions on data format, the embedded servo system is indispensable to the enhancement of track density.

Figure 1:
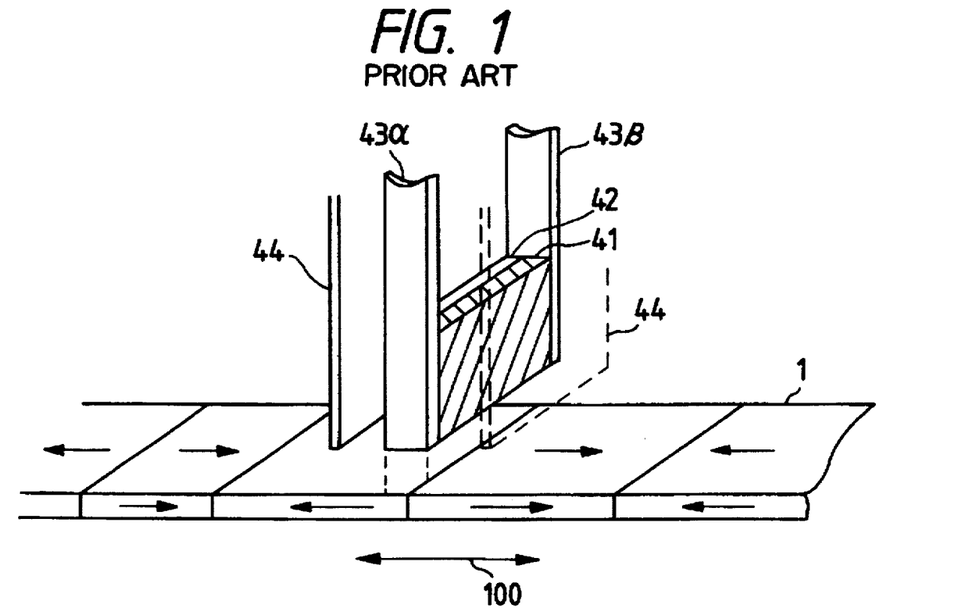
FIG. 1 is a schematic perspective view of an MR head.

The MR head will be briefly described with reference to FIG. 1 showing the fundamental construction of a common MR head of a shunt bias system in a typical perspective view. The MR head has a thin block formed by putting together a thin MR layer 41 and a thin bias layer 42, and electrodes 43α and 43β (denoted inclusively by "43") attached to the opposite sides of the thin block. A sensing current and a bias current are supplied respectively through the electrodes 43α and 43β to the MR layer 41 and the bias layer 42. Generally, the MR layer 41, the bias layer 42 and the electrodes 43 are sandwiched between shield layers 44. The shield layers 44 shield the MR layer from the ambient magnetic flux to enable the MR layer 41 to detect only the magnetic flux of a magnetization transition region. A magnetic recording medium 1 is disposed close to the MR head. In FIG. 1, the arrows 100 indicate directions along the circumference of tracks.

Figure 2:
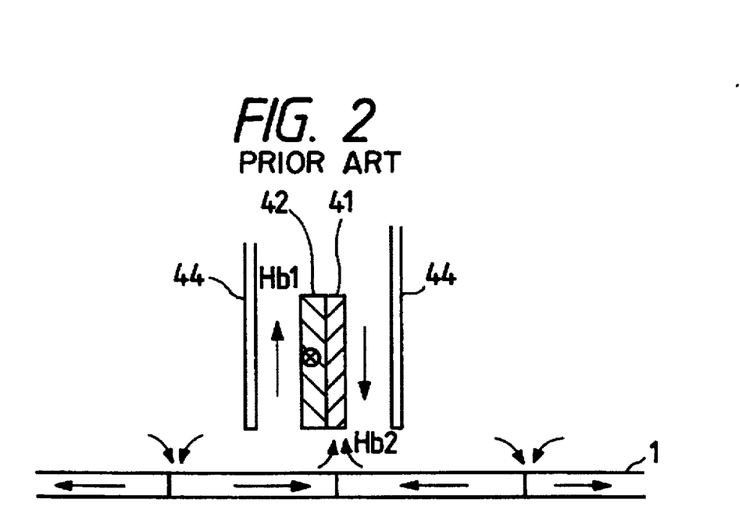
FIG. 2 is a schematic sectional view of the MR head of FIG. 1 to explain a bias magnetic field applied to the MR head.

FIG. 2 is a sectional view of the MR head of FIG. 1 and the magnetic recording medium 1 taken on line along the circumferential direction of the track. When a fixed current flows from the electrode 43α toward the electrode 43β i.e., the fixed current flows into the paper, the current flowing through the bias layer 42 creates magnetic fields $Hb_1$ and $Hb_2$. The magnetic field $Hb_2$ created on the side of the MR head acts as a bias magnetic field on the MR layer 41. The intensity of the bias magnetic field $Hb_2$ varies in direct proportion to the intensity of the bias current supplied to the bias layer 42. In a MR head of the shunt bias system, the sensing current supplied to the MR layer is changed when the bias current is changed.

The vertical component of the leakage flux from a magnetization transition region, i.e., a signal magnetic flux from the magnetic recording medium 1, and the magnetic flux of the bias magnetic field $Hb_2$ are combined and the combined magnetic flux penetrates the bottom of the MR layer 41 to produce a magnetoresistive effect within the MR layer 41.

Figure 3:
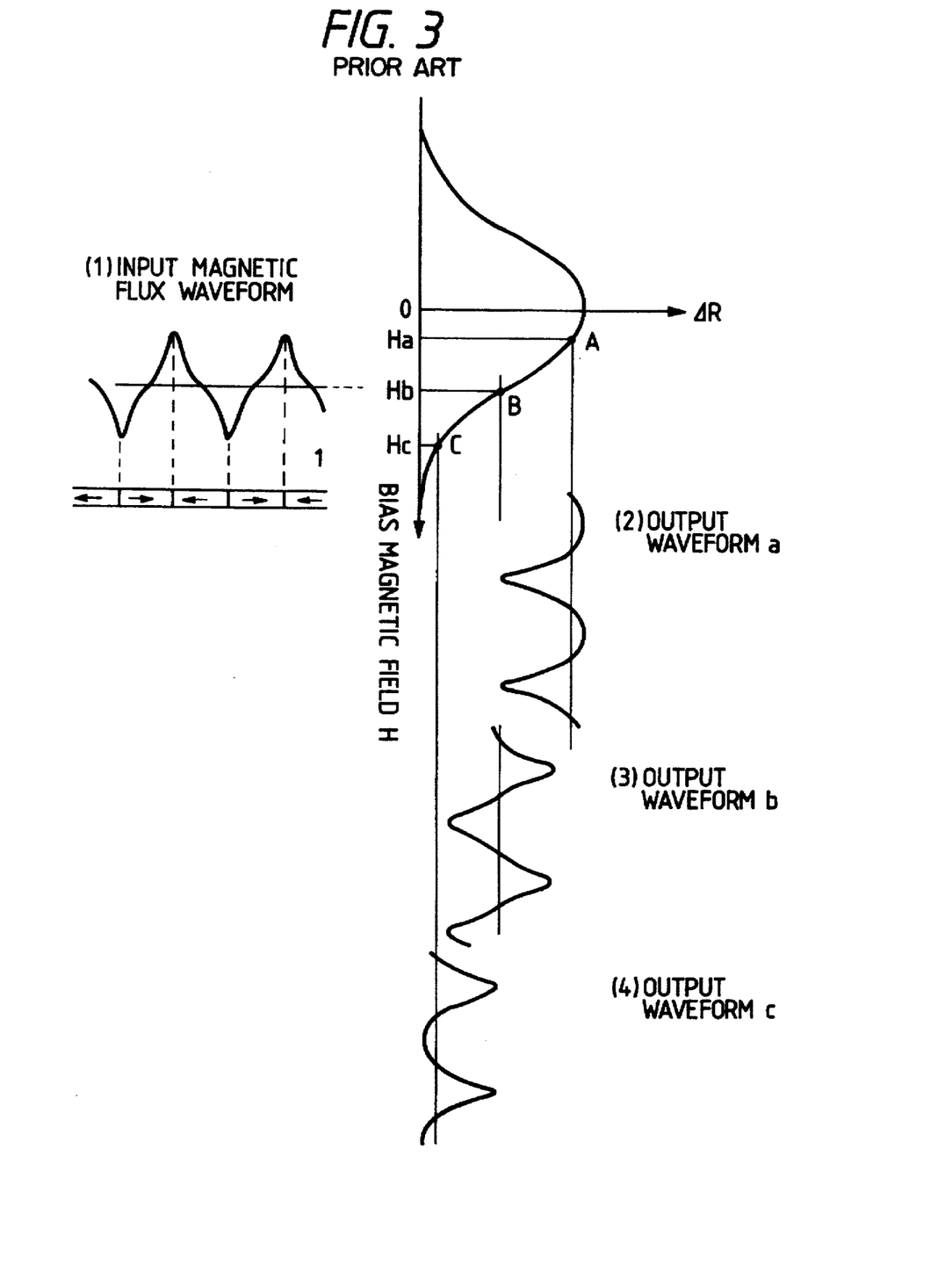
FIG. 3 is a waveform diagram of assistance in explaining the relation between a bias magnetic field applied to the MR head of FIG. 1 and the waveform of a reproduced signal.

FIG. 3 is a diagram showing the relation between the state of magnetization of the magnetic recording medium and the input magnetic flux to the MR head, and the relation between a bias magnetic field waveform and an output waveform. Shown in the upper left-hand part of FIG. 3 are the mode of transition of magnetization on the magnetic recording medium 1 and the mode of change in the input magnetic flux to the MR layer 41. Usually, the MR head of a longitudinal recording system detects the vertical component of the magnetic flux of magnetization transition regions represented by the waveform (1) in FIG. 3.

A peak appears in the magnetic flux in the vicinity of the magnetization transition region. The graph shown in the upper right-hand part of FIG. 3 shows the relation between a bias magnetic field H applied to the MR layer 41, and a resistance change ΔR in the resistance across the terminals 43α and 43β i.e., the ΔR-H characteristic of the MR head. When the magnetic flux (1) of the magnetic recording medium penetrates the MR layer 41, the electrical resistance across the electrodes 43α and 43β changes. The variation of the electrical resistance is dependent on the operating point on the ΔR-H characteristic curve. The operating point is determined by the bias magnetic field.

The sensing current is supplied across the electrodes 43α and 43β to determine the variation of the resistance through the detection of the variation of the voltage across the electrodes 43α and 43β In the shunt bias system, since both the sensing current and the bias current flow across the electrodes 43, the actual variation of resistance is the variation of the parallel resistance of the two layers. In the following description, the sum of the sensing current and the bias current will be called "sensing current". Suppose that the bias magnetic fields Ha, Hb and Hc have operating points A, B and C, respectively, output signals corresponding to the variation of the signal flux of the magnetic recording medium have output waveforms (2), (3) and (4), respectively. When the bias magnetic field is adjusted to employ an operating point in a highly linear section like the operating point B, an output signal having a waveform like the waveform (3) evenly varying in both the positive region and the negative region and closely corresponding to the input magnetic flux waveform (1) representing the variation of the input magnetic flux can be obtained.

When the MR head is incorporated into a magnetic disk drive, it is important to adjust the sensing current correctly to obtain an output signal having the foregoing highly symmetrical waveform.

In the magnetic disk drive of the embedded servo system, in particular, the MR head must follow the tracks correctly, i.e., the position of the MR head must be correctly controlled, to adjust the sensing current correctly. On the other hand, the sensing current must be correctly adjusted because a positioning error signal must be correctly detected for correct positioning control. These requisite conditions are contradictory to each other.

SUMMARY OF THE INVENTION

Accordingly, it is an object of the present invention to provide a method capable of properly and easily adjusting the sensing current to be supplied to the MR head of a magnetic disk drive and to provide a magnetic disk drive capable of high-density recording.

The present invention is characterized by the following features for solving the foregoing problems in the conventional magnetic disk drive.

A sensing current adjusting zone having a given width is formed in a specified region on a magnetic disk. A reference signal for MR head adjustment, such as a given magnetization transition interval, is recorded beforehand in the sensing current adjusting zone in a servo track write mode. Although the position of the sensing current adjusting zone is optional, it is desirable that the sensing current adjusting zone is provided at concentric regions in the innermost or outermost periphery of the magnetic disk.

The MR head is surely positioned in the sensing current adjusting zone by an MR head positioning means. For example, an MR head positioning means has a stopper limiting the range of movement of an actuator for moving the MR head on the magnetic disk, and the stopper is disposed so that the position of the sensing current adjusting zone is determined when the actuator is stopped by the stopper. The sensing current adjusting zone has a width large enough to enable the MR head to follow the sensing current adjusting zone without requiring positioning control.

In addition, there is provided a current control circuit for controlling the sensing current. If necessary, the magnetic disk drive is provided with a feedback control system to reproduce a reference signal from the sensing current adjusting zone and to adjust the sensing current on the basis of the reproduced reference signal.

In a magnetic disk drive in accordance with the present invention that uses the sensing current adjusting zone, the MR head is moved into the sensing current adjusting zone for sensing current adjustment, and then reproduces a reference signal recorded in the sensing current adjusting zone. The standard for sensing current adjustment is selectively determined according to the occasion. For example, the sensing current is adjusted so that the difference between the respective absolute values of the plus peak and the minus peak of the waveform of the reproduced signal is reduced to the least possible extent.

In the magnetic disk drive of the embedded servo system, the MR head can be positioned in the sensing current adjusting zone in a specified region on the magnetic disk by an ordinary positioning control operation based on positioning information obtained from the servo surface.

Another method of positioning the MR head in the sensing current adjusting zone, which positions the MR head in the sensing current adjusting zone by stopping the actuator by the stopper, moves the actuator forcibly for sensing current adjustment so as to press the actuator against the stopper and reproduces the signal from the sensing current adjusting zone by the MR head. Since this method is capable of positioning the MR head in the sensing current adjusting zone without requiring feedback control, the sensing current can be correctly adjusted even if the MR head is required to reproduce the servo signal. When the reference signals are recorded in a recording width corresponding to the width of a plurality of tracks in the same phase so that the recording width of the radially adjacent reference signals overlap each other, the intensity of the reproduced signal does not change as long as the MR head remains in the sensing current adjusting zone and, consequently, the sensing current can be easily adjusted. The sensing current adjusting zone formed in the inner periphery or the outer periphery of the magnetic disk facilitates positioning the MR head in the sensing current adjusting zone.

DETAILED DESCRIPTION OF THE PREFERRED EMBODIMENTS

Figure 4A:
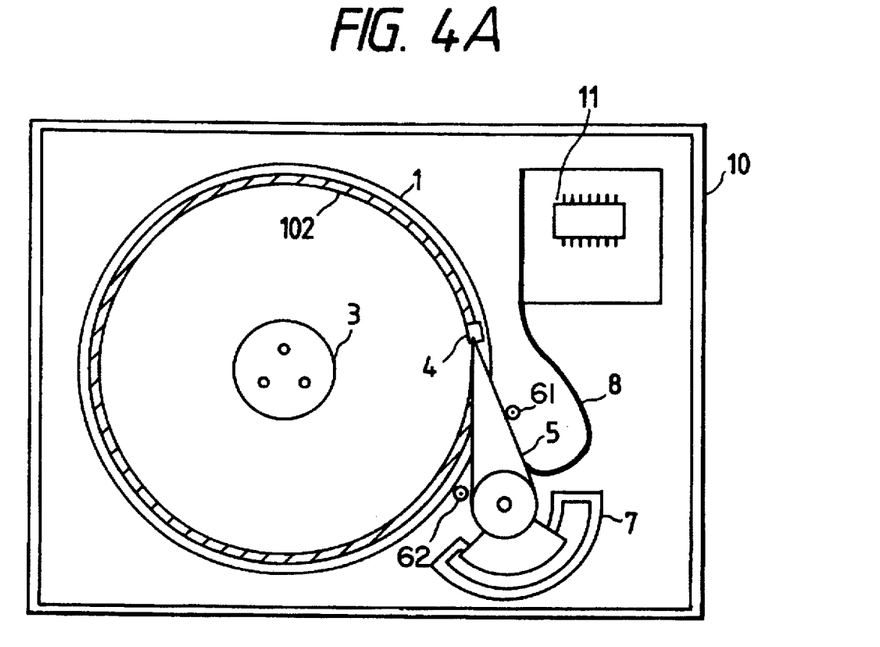
FIGS. 4A and 4B are plan views of a magnetic disk drive in accordance with the present invention.
Figure 4B:
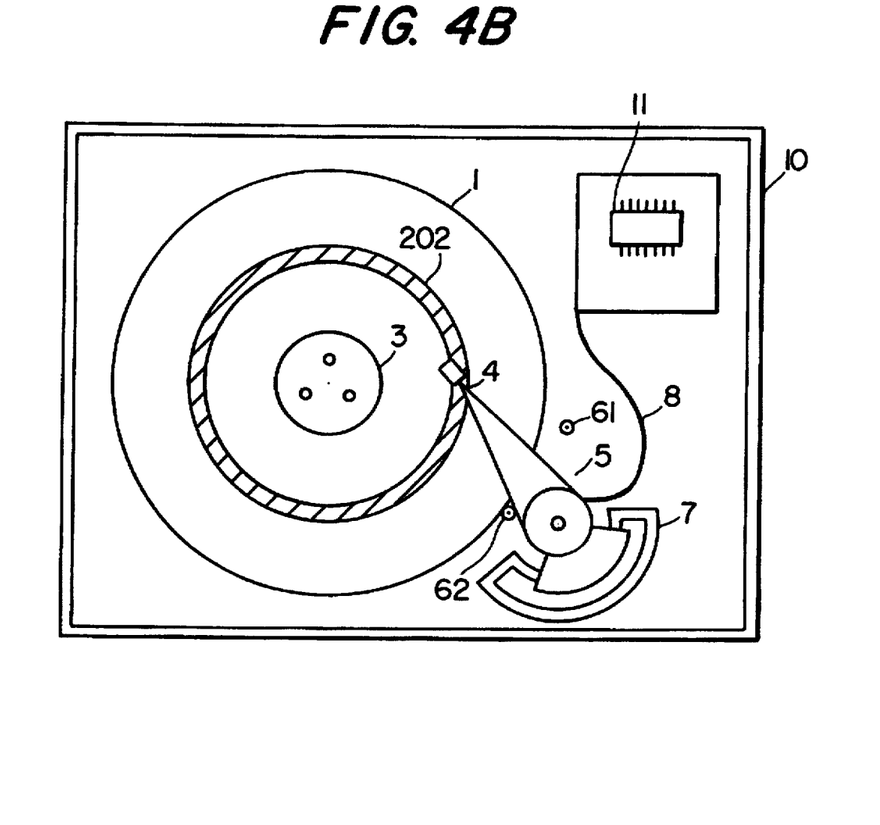

Referring to FIG. 4A, a magnetic disk drive in a preferred embodiment according to the present invention comprises, as principal components, a magnetic disk 1, i.e., a magnetic recording medium, provided with a sensing current adjusting zone 102 in its peripheral area, a disk clamper 3 for fixedly holding the magnetic disk 1 on the spindle of a spindle motor, not shown, a composite head 4 consisting of a MR head and a signal recording head (an inductive recording head), a swing arm 5 supporting the composite head 4 on its extremity, a rotary actuator 7, arm stoppers 61 and 62, a flexible printed wiring board 8, a preamplifier 11 mounted on the flexible printed circuit board 8, and a case 10. FIG. 4B is similar to FIG. 4A with a sensing current adjusting zone 202 in its inner peripheral area.

Figure 5A:
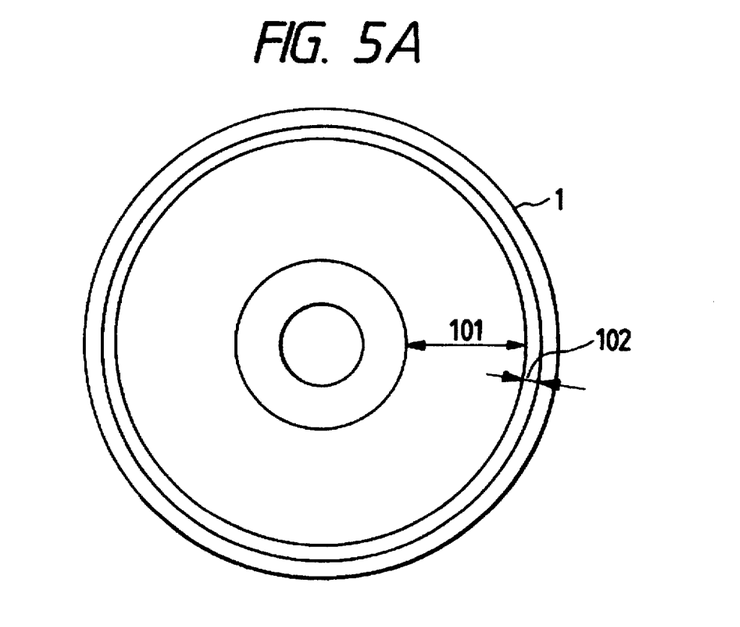
FIGS. 5A and 5B are plan views of a magnetic disk to explain a signal pattern formed on the magnetic disk in accordance with the present invention.
Figure 5B:
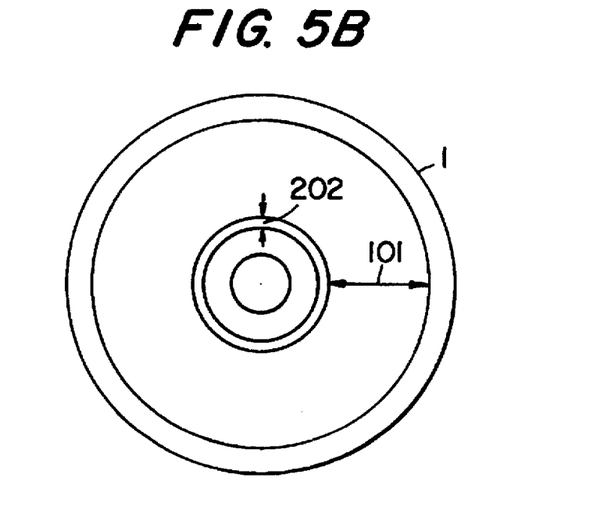
Figure 6A:
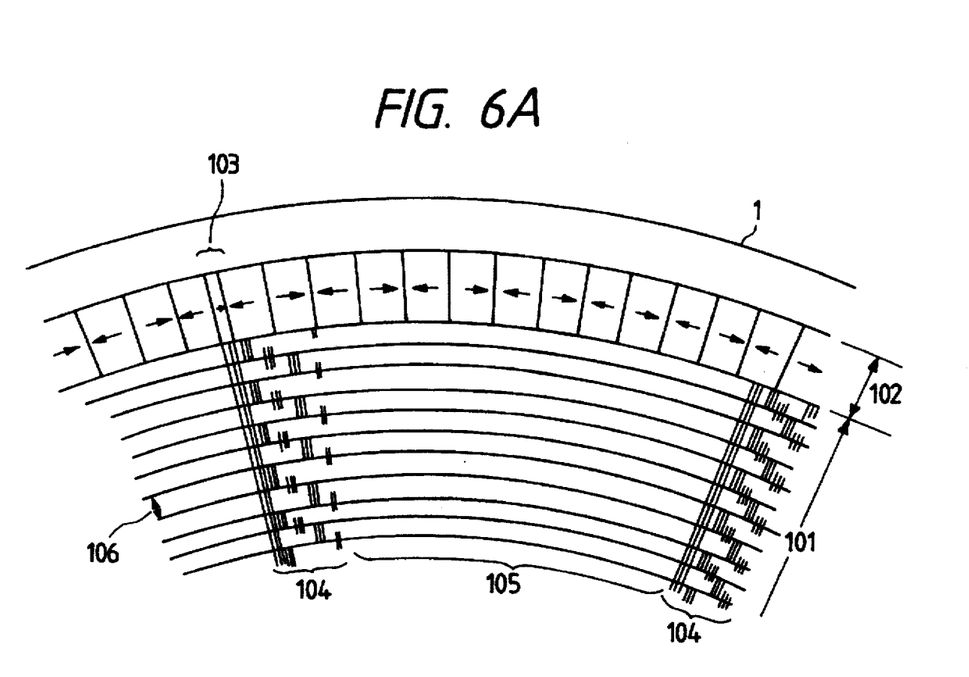
FIGS. 6A and 6B are fragmentary plan views of a magnetic disk to explain the arrangement of reference signals on a magnetic disk in accordance with the present invention.
Figure 6B:
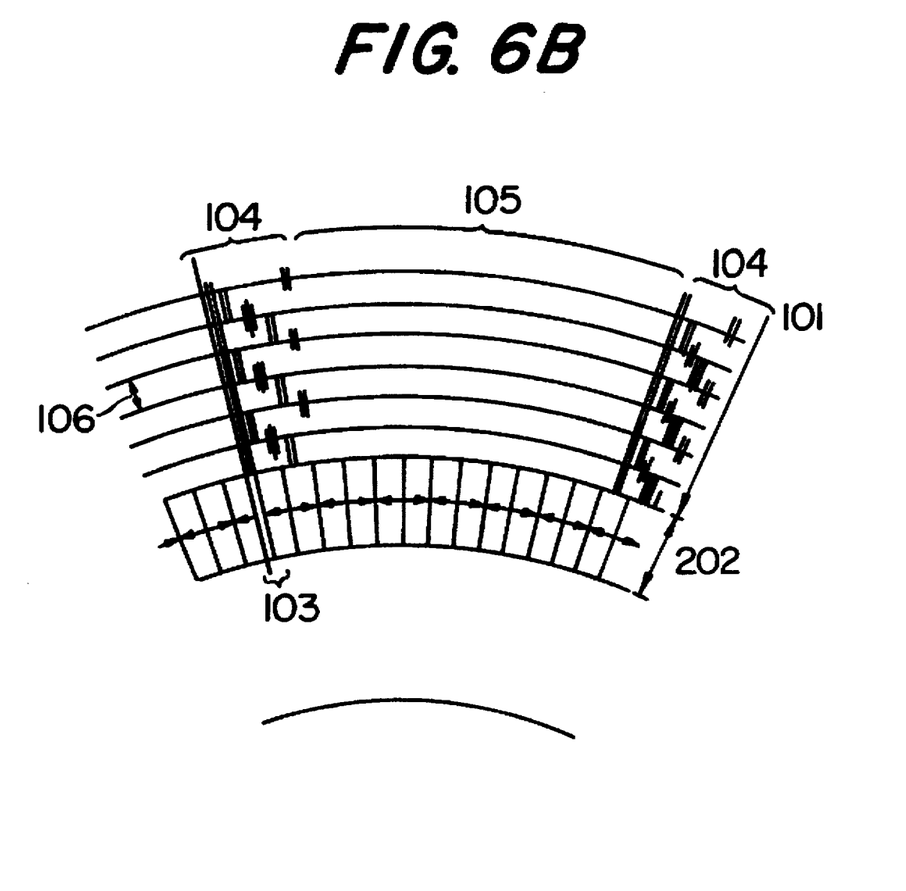

The magnetic disk drive in this embodiment will be described as applied to a embedded servo system or an embedded servo with servo surface system. Referring to FIG. 5A, the magnetic disk 1 has a data zone 101, and the sensing current adjusting zone 102 formed in the outer periphery thereof so as to surround the data zone 101. FIG. 5B shows an arrangement similar to FIG. 5A with a sensing current adjusting zone 202 being formed at the inner periphery of the magnetic disk. Referring to FIG. 6A showing part of the magnetic disk 1 in an enlarged plan view, the arrows marked in the sensing current adjusting zone 102 indicate typically the directions of magnetization of reference signals recorded in the sensing current adjusting zone 102. In this embodiment, the reference signal has a signal pattern of magnetization transition regions arranged at equal intervals. Tracks are formed at a pitch 106 (FIG. 6A). In this embodiment, the width of the sensing current adjusting zone 102 is equal to the width of three tracks. The reference signals are recorded in the same phase across the width of the sensing current adjusting zone 102. Data is recorded by the user in the data zone 101. The data zone 101 has servo information fields 104 and data fields 105. FIG. 6B is similar to FIG. 6A with a sensing current adjusting zone 202 being at the inner peripheral area.

The width of the sensing current adjusting zone 102 is greater than an eccentricity and such which will result from the thermal expansion of the mechanical system of the magnetic disk drive. The width of the sensing current adjusting zone 102 must be, at the smallest, greater than the width of the data tracks.

The reference signal need not have a simple signal pattern such as shown in FIG. 6A; the reference signal may have a signal pattern of a repetition of a pattern consisting of a combination of a plurality of magnetization transition regions arranged at different intervals. The use of a reference signal having such a pattern according to the characteristics of the MR head enables optimum sensing current adjustment. In either case, it is preferable that the reference signals recorded in the sensing current adjusting zone 102 can be discriminated from signals recorded in the data zone 101. The reference signals recorded in the sensing current adjusting zone 102 can be readily identified during operation in the reproducing mode by at least one marker signal (identification signal) 103 inserted in one turn of the sensing current adjusting zone 102.

Figure 7:
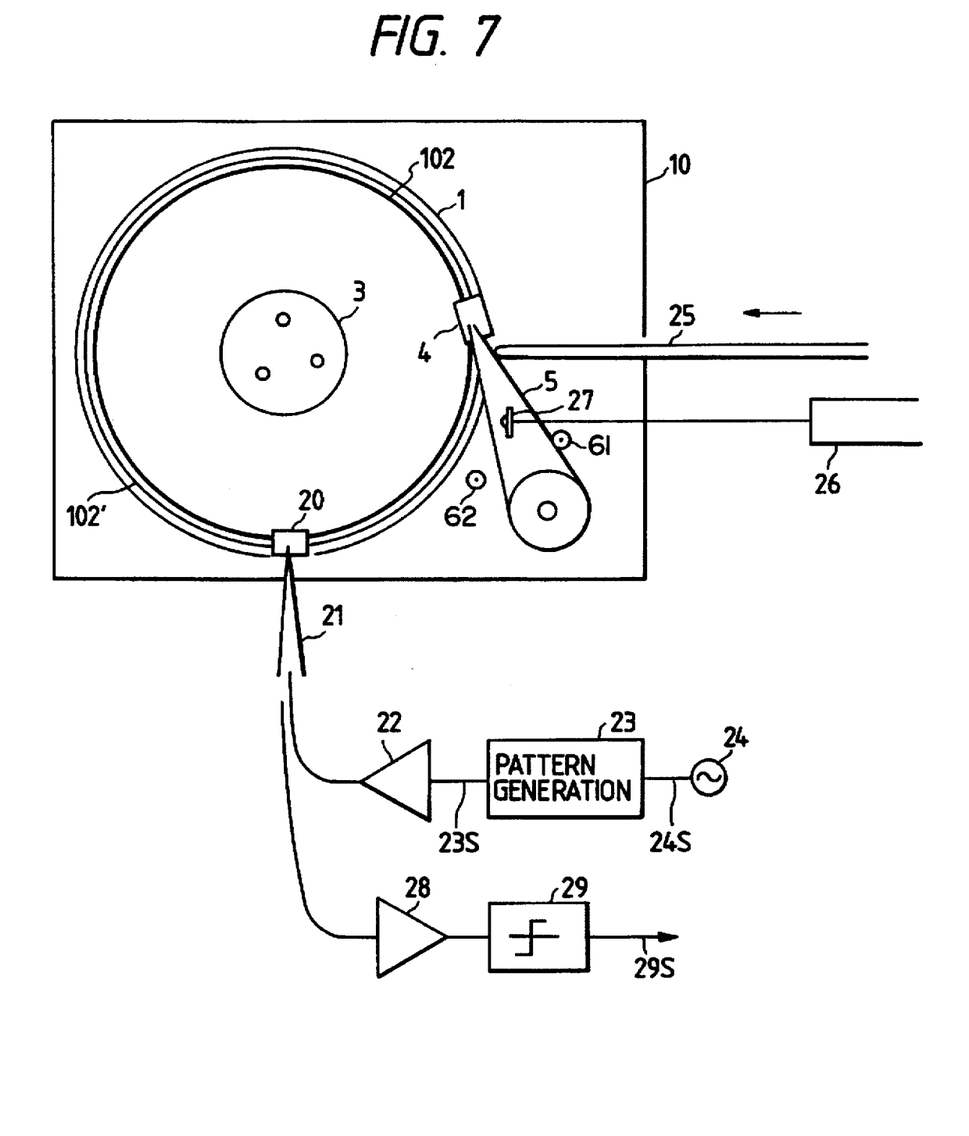
FIG. 7 is a plan view of a magnetic disk drive to explain a known servo write method.

A method of recording the reference signals in the sensing current adjusting zone 102 will be described hereinafter. The reference signals can be recorded in the sensing current adjusting zone 102 in a servo track write step for recording positioning information in the positioning information field 104 in the process of 10 manufacturing the magnetic disk drive. A generally known servo track write method will be described with reference to FIG. 7 prior to the description of a method of recording the reference signals in the sensing current adjusting zone 102. Generally, when carrying out servo track write for a magnetic disk drive, a servo track writer is used in combination with the composite head 4. The servo track writer comprises, as principal components, a clock head 20, a clock head arm 21 holding the clock head 20 on its extremity, a push rod 25, a laser interferometor positioning system 26 and a reflecting mirror 27. The reflecting mirror 27 is attached to a member which moves together with the composite head 4, such as the swing arm 5. The laser interferometor positioning system 26 projects a laser beam on the reflecting mirror 27 and receives the reflected laser beam from the reflecting mirror 27 to monitor the position of the composite head 4 accurately. The push rod 25 pushes the swing arm 5 in the direction of the arrow to move the composite head 4 while the positioning information pattern is recorded by the head. When recording the positioning information pattern, a reference clock signal correctly corresponds to the angle of turning of the magnetic disk regardless of the radial position of the composite head 4. Accordingly, prior to the servo track write operation, a reference clock track 102' as a basis for servo track write is recorded on, for example, the outermost track of the magnetic disk 1 by the clock head 20. Generally, the reference clock track 102' is a reference signal pattern for a servo track write process consisting of a predetermined integral number of magnetization transition regions, for example, 1,000,000 magnetization transition regions, accurately recorded on one turn of the track. The reference clock track 102' is generated by a reference clock pattern generator 23 on the basis of a clock 24s generated by a reference oscillator 24 included in the servo track writer. The reference clock pattern is amplified by a write amplifier 22, the reference clock pattern is converted into a corresponding magnetic signal and the magnetic signal is recorded on the magnetic disk 1 by the clock head. The operation for recording the reference clock track 102' is repeated by way of trial and error until the predetermined number of magnetization transition regions are recorded accurately on one turn of the track. After the reference clock track 102' has been correctly recorded, the reference clock track 102' is reproduced by the clock head 20, the reproduced reference clock is amplified by a preamplifier 28, and then a pulse forming circuit 29 generates a reference clock 29s, i.e., a string of pulses, corresponding to the reproduced reference clock pattern on the reference clock track. Since the reference clock 29s is accurately synchronous with the angle of turning of the magnetic disk 1, the reference clock 29s is used as a reference clock for a servo track write operation.

The method of recording on the sensing current adjusting zone, which is the feature of the present invention, will be explained in the following. In the following, there will be explained an example in which the sensing current adjusting zone is formed in an inner periphery of the reference clock track.

The reference signal pattern 102 can be recorded in the sensing current adjusting zone 102 by the inductive recording head of the magnetic disk drive. When recording the reference signal pattern in the sensing current adjusting zone 102, a driving current is supplied to the rotary actuator 7 to turn the swing arm 5 forcibly as far as the swing arm 5 is stopped by the stopper 61 to position the composite head 4 at an origin for reference signal recording. When the reference signal pattern is recorded with the swing arm 5 held forcibly in contact with the stopper 61, the position of the outer circumference of the sensing current adjusting zone 102 is dependent on the positional relation between the swing arm 5 and the stopper 61. After the reference signal pattern has been recorded for one turn of the magnetic disk 1, the swing arm 5 is turned counterclockwise, as viewed in FIG. 7, to shift the composite head 4 radially by a distance smaller than the track width, while the position of the recording head is monitored by the laser interferometor positioning system 26, the reference signal is recorded again in the same phase as that of the reference signal recorded in the preceding reference signal recording cycle. This procedure is repeated a predetermined number of cycles to record the reference signals in the entire area of the sensing current adjusting zone 102. The reference clock signal 29s generated by the clock head 20 of the servo track writer may be used for recording the reference signals. Basically, the operation for recording the reference signals in the sensing current adjusting zone 102 can be comparatively easily achieved by changing the control program of a generally known servo track writer.

Since the reference clock track 102' recorded for servo track writing is unnecessary after the servo track write step has been completed, the reference clock track 102' may be used as the reference signals of the sensing current adjusting zone 102. In this case, it is not necessary to record on the sensing current adjusting zone at the servo track write process. When the reference clock track 102' used in the servo track write step as the reference signal for sensing current adjustment, the position of the reference clock track 102' is determined so that the MR head of the composite head 4 is able to reproduce the reference clock track 102' when the swing arm 5 is held in contact with the stopper 6 by the rotary actuator 7. When recording the reference clock track 102' at such a position, it is desirable to determine the azimuth angle of the clock head 20 so that the azimuth angle of the reference clock track 102' is equal to that of the MR head of the composite head 4. It is usual that the track width of the clock head 20 for recording and reproducing the reference clock track 102' is sufficiently greater than the recording track width of the MR head of the composite head 4. The position of the reference clock track 102' can be comparatively easily determined for servo track writing.

A method of positioning the MR head for sensing current adjustment will be described hereinafter. Positioning of the head in the sensing current adjusting zone 102 for sensing current adjustment for an embedded servo system and an embedded servo with servo surface system, similarly to the positioning of the head in the sensing current adjusting zone 102 for recording the reference signal patterns, can be achieved by turning the swing arm 5 forcibly by flowing a driving current in the rotary actuator 7 as far as the swing arm 5 is stopped by the stopper 61. Since the width of the sensing current adjusting zone 102 in which the reference signals are recorded is greater than the reproducing track width of the MR head, the reference signals can be accurately reproduced even if the MR head is positioned in a somewhat low accuracy.

The sensing current adjusting zone 102 may be formed in the inner periphery of the magnetic disk 1. When the reference clock track 102' is used also as the reference signal patterns for sensing current adjustment as mentioned above, it is preferable to form the sensing current adjusting zone 102 in the outer periphery of the magnetic disk 1. When the surface of the magnetic disk 1 is divided into a plurality of radial zones for a zone recording system, in which the recording capacity of the outer tracks is greater than that of the inner tracks, it is preferable to form the sensing current adjusting zone 102 in the inner periphery of the magnetic disk 1 utilizing the stopper 62 so as to use the outer radial zones having a greater storage capacity as data zones and thereby use the storage capacity of the magnetic disk efficiently. If the stopper 61 or 62 is movable and is capable of being moved to a position where the stopper 61 or 62 will not obstruct recording and reproducing operations, tracks in an optional intermediate radial zones may be used as the sensing current adjusting zone. Most magnetic disk units are provided with a crash stopper for limiting the range of movement of the magnetic head to prevent damaging the head by the unexpected runaway of the rotary actuator 7. Since the crash stopper is functionally equivalent to the stopper 61 or 62, the crash stopper may be used for positioning the MR head in the sensing current adjusting zone 102.

Figure 8:
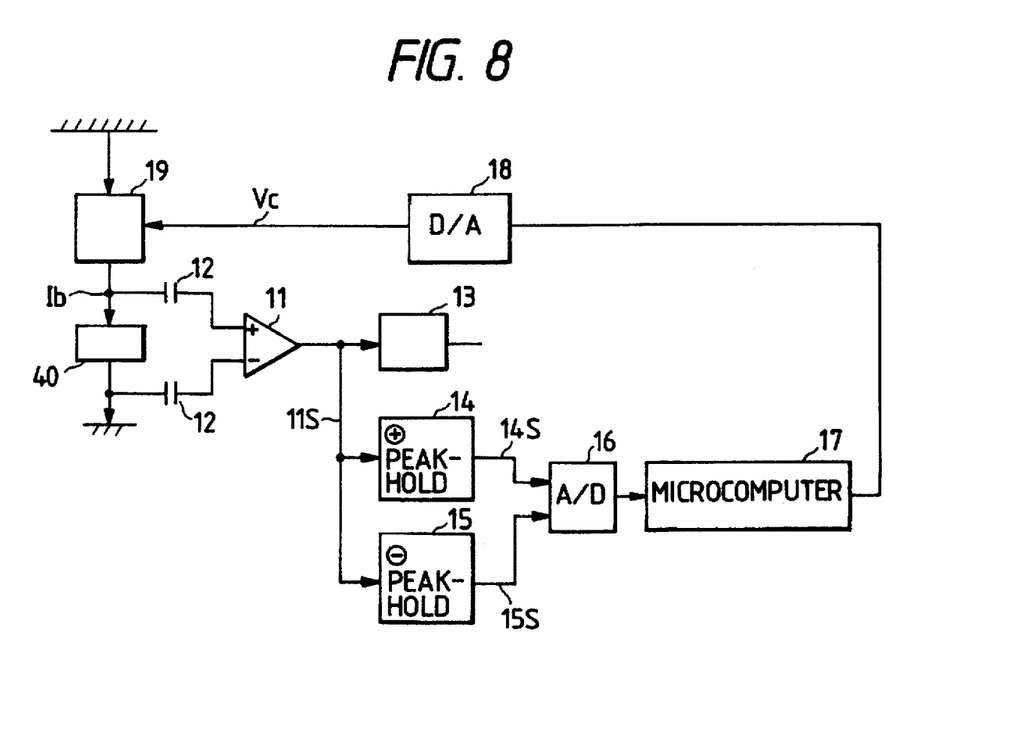
FIG. 8 is a block diagram of a sensing current adjusting circuit included in a magnetic disk drive in a preferred embodiment according to the present invention.

FIG. 8 shows a sensing current adjusting circuit included in the magnetic disk drive. The sensing current adjusting circuit adjusts the sensing current automatically by using the sensing current adjusting zone 102. The sensing current adjusting circuit comprises an MR head 40, a capacitor 12 for blocking adc component, a differential amplifier 11, a discriminator 13 for reproducing signals, a plus-peak hold circuit 14, a minus-peak hold circuit 15, an A/D converter 16, a microcomputer 17, a D/A converter 18 and a voltage-controlled sensing current driver 19.

Figure 9:
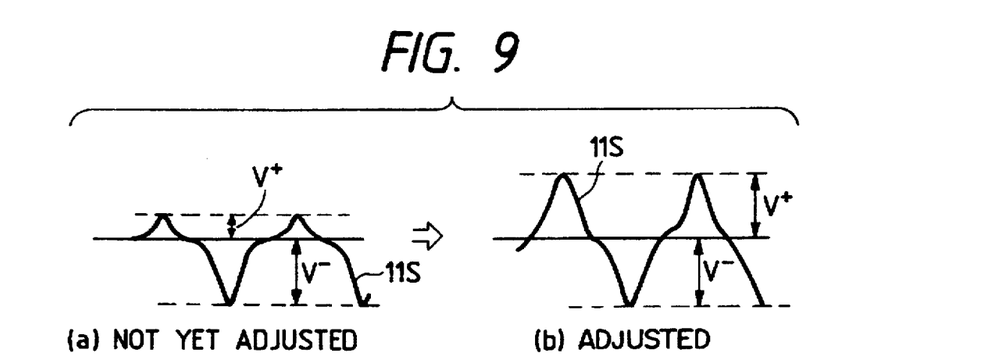
FIG. 9 is a waveform diagram of assistance in explaining the operation of the sensing current adjusting circuit of FIG. 8.

FIGS. 9(a) and 9(b) are diagrams of assistance in explaining the operation of the sensing current adjusting circuit of FIG. 8. When adjusting the sensing current, the MR head 40 is moved forcibly into the sensing current adjusting zone 102 by the rotary actuator 7 to set the MR head 40 for reference signal reproducing. The waveform of the reproduced reference signal is represented by the variation of the voltage across the terminals of the MR head 40. The differential amplifier 11 amplifies the reproduced reference signal and provides an amplified reproduced reference signal 11s. Suppose that the amplified reproduced reference signal 11s has a waveform in which the positive peak signal voltage and the negative peak signal voltage are different from each other as shown in FIG. 9(a) when the sensing current Ib is not adjusted. The plus-peak hold circuit 14 and the minus-peak hold circuit 15 detect a plus peak voltage $V^+$ and a minus peak voltage $V^-$, respectively of the reproduced reference signal 11s, the A/D converter 16 converts the plus peak voltage $V^+$ and the minus peak voltage $V^-$ into corresponding digital values and gives the digital values to the microcomputer 17. The microcomputer 17 calculates data for producing a correction voltage on the basis of the difference between the plus peak voltage $V^+$ and the minus peak voltage $V^-$ and gives the data to the D/A converter 18. Then, the D/A converter 18 gives an analog voltage Vc to the voltage-controlled sensing current driver 19 and the voltage-controlled sensing current driver 19 supplies the sensing current Ib to the MR head 40. The sensing current Ib is thus controlled in a feedback control mode so that the plus peak voltage $V^+$ and the minus peak voltage $V^-$ are equal to each other. The A/D converter 16, the microcomputer 17 and the D/A converter 18 may be substituted by a differential amplifier connected to the outputs of the peak hold circuits 14 and 15 to receive the output signals 14s and 15s to simplify the circuit configuration. However the use of the microcomputer 17 enables complicated arithmetic operations and decisions using previously stored data.

Although the present invention has been described as applied to a magnetic disk drive of the embedded servo system and the embedded servo with servo surface system, the present invention is applicable also to a magnetic disk drive of a dedicated servo system having a servo surface. The positioning of the head of a magnetic disk drive having a servo surface is easier than that of the head of a magnetic disk drive having only a data surface. The reference signal pattern can be recorded in the sensing current adjusting zone by the head for each data surface in an optional track zone of the data surface by positioning the head by the dedicated servo system, and the MR head can be positioned in the sensing current adjusting zone for sensing current adjustment in the same manner. This system is particularly effective for a magnetic disk drive of the dedicated servo system provided with an inductive head as a servo head, and an MR head as a reproducing head, because sensing current adjustment for the servo head is unnecessary.

In the case of a magnetic disk drive provided with an MR head as a servo head, similarly to the case of a data head of the embedded servo system, the sensing current for the servo head can be adjusted by forming a sensing current adjusting zone at a position where the servo head on the servo surface is positioned by the stopper. In the latter case, first a sensing current for the MR head, i.e., the servo head, is adjusted, and then the servo head is used for positioning, a sensing current adjusting zone is formed in an optional track zone on each data surface, and a sensing current for the MR head of each data surface is adjusted. The servo head and the data head may be adjusted individually.

The present invention enables the accurate adjustment of a sensing current for the MR head in a magnetic disk drive adjusting process by using the sensing current adjusting zone 102 formed in a specified area of a magnetic disk and accurately positioning the MR head in the sensing current adjusting zone. The sensing current can be automatically adjusted out after the magnetic disk drive has been delivered to the user by the feedback control loop for adjusting the reproduced reference signal reproduced from the sensing current adjusting zone by the sensing current adjusting circuit, so that an optimum sensing current for the MR head can be determined even if the characteristics of the MR head changes with time.

What is claimed is:

1. A magnetic disk drive comprising: at least one magnetic disk mounted on a spindle; a first slider on which a magnetoresistive device for reproducing information recorded on the surface of the magnetic disk is mounted; a head carriage for supporting as a unitary configuration at least one slider including said first slider; and a head moving means for driving said head carriage to move said at least one slider on the surface of said magnetic disk, characterized in that a specified zone is formed in the surface of said magnetic disk, signals for adjusting a sensing current to be supplied to the magnetoresistive device are recorded in said specified zone, the magnetoresistive device held on the at least one slider reproduces information from said magnetic disk, and in that means for positioning the magnetoresistive device in said specified zone is provided, said means for positioning the magnetoresistive device having at least one stopper for limiting a range of movement of said head moving means so that said magnetoresistive device is positioned in the specified zone having said signals for adjusting the sensing current recorded in the surface of said magnetic disk when said head moving means is stopped by said at least one stopper.

2. A magnetic disk drive according to claim 1, wherein the specified zone is one of a plurality of concentric annular zones on the surface of the magnetic disk.

3. A magnetic disk drive according to claim 1 or 2, wherein the specified zone is formed proximate to at least one of an outermost and an innermost periphery of the magnetic disk.

4. A magnetic disk drive according to claim 3, wherein the specified zone is formed proximate to the outermost periphery of the magnetic disk.

5. A magnetic disk drive according to claim 3, wherein the specified zone is formed proximate to the innermost periphery of the magnetic disk.

6. A magnetic disk drive according to claim 1, wherein at least one surface of the magnetic disk mounted on the spindle is a servo surface, and wherein the head moving means is controlled according to a positioning signal reproduced from the servo surface by a servo head to position the magnetoresistive device, which is on said surface of the magnetic disk, in the specified zone for adjusting the bias current.

7. A magnetic disk drive according to claim 1, further comprising a current controller for adjusting the sensing current to be supplied to the magnetoresistive device.

8. A magnetic disk drive according to claim 1, wherein the signals for adjusting the sensing current recorded in said specified zone are reproduced by said magnetoresistive device, and the sensing current is adjusted automatically on the basis of the reproduced signals.

9. A magnetic disk drive according to claim 1, wherein each of the signals recorded on said specified zone for adjusting the sensing current is a repetition of a given length of specified pattern consisting of a plurality of magnetization transition regions.

10. A magnetic disk drive according to claim 1, wherein each of the signals recorded on said specified zone for adjusting the sensing current is a repetition of a signal pattern consisting of periodic magnetization transition regions.

11. A magnetic disk drive according to claim 1, wherein an identification signal for identifying an area for adjusting the current in the magnetoresistive device is included in the signals recorded on said specified zone for adjusting the sensing current.

12. A magnetic disk drive according to claim 1, wherein the signals recorded on said specified zone for adjusting the sensing current are recorded in a recording area having a width greater than a width of data tracks of the magnetic disk.

13. A magnetic disk drive according to claim 12, wherein the respective phases of magnetization transition, in the longitudinal direction of the tracks, of the signals for adjusting the sensing current recorded are the same.

14. A magnetic disk drive according to claim 1, wherein the magnetoresistive device is positioned in said specified zone for adjusting the sensing current to be supplied to the magnetoresistive device so as to enable the magnetoresistive device to correctly reproduce information recorded on the surface of the magnetic disk when positioned in zones of the magnetic disk other than said specified zone.

15. A magnetic disk drive according to claim 1, wherein the specified zone is an annular zone in the surface of the magnetic disk and the signals for adjusting the sensing current are only recorded in the specified zone.

16. A magnetic disk drive according to claim 1, wherein the information recorded on the surface of the magnetic disk includes embedded servo information.

* * * * *